United States Patent [19]

Schreiber

[11] 4,092,904

[45] June 6, 1978

[54] MEANS FOR RETAINING A PISTON ON A PISTON ROD

[75] Inventor: Larry Donald Schreiber, Dubuque, Iowa

[73] Assignee: Deere & Company, Moline, Ill.

[21] Appl. No.: 724,396

[22] Filed: Sep. 17, 1976

[51] Int. Cl.² .......................... F15B 15/22; F16J 1/00
[52] U.S. Cl. ...................................... 91/395; 403/320; 403/343; 151/28; 92/255
[58] Field of Search .................. 92/165 PR, 255, 256, 92/257, 258, 259; 91/395, 394; 403/320, 343, 319; 151/28

[56] References Cited

U.S. PATENT DOCUMENTS

| | | | |
|---|---|---|---|
| 1,187,871 | 6/1916 | Thomas | 403/320 |
| 1,420,737 | 6/1922 | Palmgren | 151/28 |
| 2,188,957 | 2/1940 | Pflauser | 92/258 |
| 3,904,301 | 9/1975 | Schroeder | 403/320 |
| 3,998,132 | 12/1975 | Rasigade | 91/395 |

FOREIGN PATENT DOCUMENTS 378,905  9/1922  Germany .......................... 403/320

*Primary Examiner*—Paul E. Maslousky

[57] ABSTRACT

A piston of a hydraulic actuator is threaded on one end of a piston rod and is prevented from becoming unthreaded therefrom by means of a radially extending key received in a keyway formed by cooperating recesses in the ends of the piston and piston rod. A threaded fastener extends axially into the piston rod and holds the key in place.

1 Claim, 5 Drawing Figures

MEANS FOR RETAINING A PISTON ON A PISTON ROD

BACKGROUND OF THE INVENTION

The present invention relates to hydraulic actuators and more specifically relates to means for removably mounting pistons on piston rods.

It is presently a common practice to removably mount a piston on a piston rod by threading the piston on one end of the rod and to prevent the piston from becoming accidentally unthreaded from the rod by inserting a key in an axially extending keyway formed by opposed cooperating grooves in the interior surface of the piston and in the exterior surface of the rod.

This known connection of a piston to a piston rod is not satisfactory since high forces tending to rotate the piston on the rod damage the threads in the area of the keyway making it difficult to remove the piston from the piston rod for service.

SUMMARY OF THE INVENTION

According to the present invention, there is provided an improved means for preventing a piston from becoming accidentally unthreaded from a piston rod.

An object of the invention is to provide a simple, inexpensive retainer design for preventing a piston from becoming accidentally unthreaded from a piston rod without damage to the threads.

Another object is to provide a means including a key and keyway for retaining a piston completely threaded onto a piston rod with the key and keyway disposed free of the piston and piston rod threads. Specifically, it is an object to provide recesses in the ends of the piston and piston rod which are brought into alignment when the piston is completely threaded onto the rod and to mount a key in the aligned recesses to prevent relative rotation between the piston and piston rod.

Yet another object is to provide a key, for preventing relative rotation between a piston and piston rod, which is mounted such that its retainer is not subject to being loosened by torque applied to the key.

Still another object is to provide a key and keyway arrangement for retaining a threaded piston on a threaded piston rod, wherein the key has a relatively large bearing area and the keyway is disposed free of the threads so as to not deminish the strength or bearing area thereof.

These and other objects will become apparent from a reading of the ensuing description with the appended drawings.

DESCRIPTION OF THE PREFERRED EMBODIMENT

Figure 1:
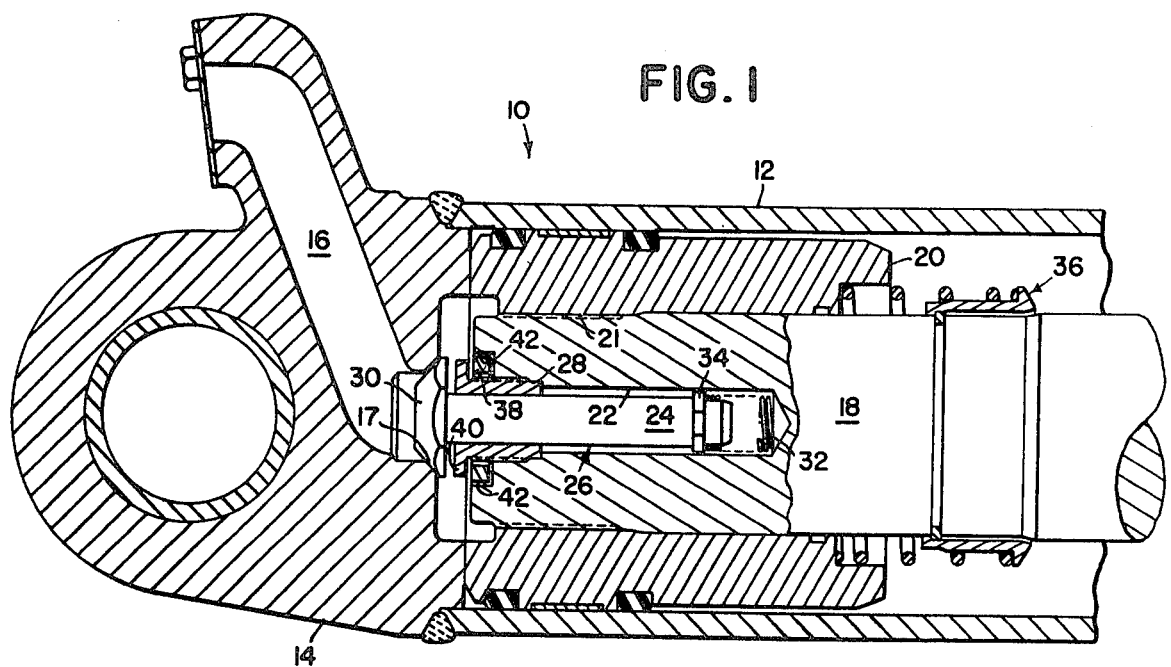
FIG. 1 is a partial longitudinal sectional view of a hydraulic actuator embodying one form of piston and piston rod constructed according to the principles of the present invention.

Referring now to FIG. 1, therein is shown a hydraulic actuator indicated in its entirety by the reference numeral 10. The actuator 10 includes a cylinder 12 to which is fixed right and left end members or caps with only the left end member being shown at 14. A fluid passage 16 extends through the cap 14 and has an inner end centered on the longitudinal axis of the cylinder 12 and shaped to define a conical valve seat 17. Reciprocably mounted in the cylinder 12 is a piston-piston rod assembly comprising a piston rod 18 having a piston 20 threadedly received, as at 21 on the left end thereof, it being noted that the respective threads of the piston and piston rod begin at locations spaced rightwardly of the respective extreme left ends hereof.

A first brake assembly for braking leftward motion of the piston-piston rod assembly as it approaches the end member 14 is mounted in the left end of the rod 18 and includes a blind bore 22 extending into the rod 18 from its left end and having a stem 24 of a poppet valve element 26 reciprocably received therein and axially centered by a hollow guide member 28 threaded in the left end of the bore 22. The left end of the valve element 26 is defined by a conically shaped head 30 which is shaped complimentary to the valve seat 17 and becomes engaged therewith to brake the motion of the piston-piston rod assembly as the latter approaches the end member 14. The valve element is illustrated in a fully retracted position that it occupies when the piston 20 engages the end member 14 and a spring 32 is compressed between the bottom of the bore 22 and a snap ring 34 and biases the valve member 26 to a fully extended position (not shown) wherein the snap ring 34 engages the right end of the guide member 28.

A second brake assembly 36 is located at the right end of the piston 20 for braking rightward movement of the piston-piston rod assembly as the latter approaches a right end member (not shown) fixed to the cylinder 12 and since the assembly 36 forms no part of and does not cooperate with the present invention no further description thereof is given.

Figure 2:
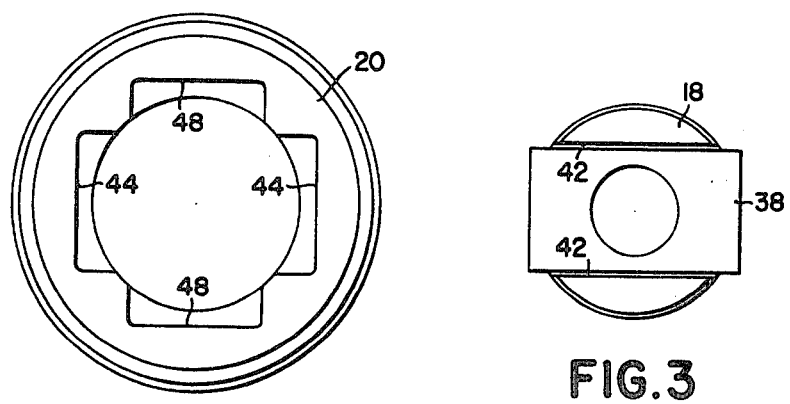
FIG. 2 is a left end view of the piston shown in FIG. 1.
Figure 3:
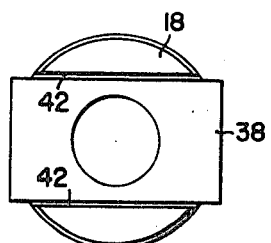
FIG. 3 is left end view of the piston rod and key shown in FIG. 1.

Now, referring to FIGS. 2 and 3 in addition to FIG. 1, it can be seen that a rectangular key or lock element 38 is loosely received on the guide member 28, to the right of an enlarged left end portion 40 of the latter, and is received in and is radially disposed in a diametrically extending recess 42 formed in the left end of the piston rod 18 and a first set of diametrically opposite recesses 44 formed in the left end of the piston 20. The piston 20 is provided with a second set of diametrically opposite recesses 48 respectively angularly offset, by 90°, from the recesses 44 and which may be more conveniently aligned with the recess 42 than the recesses 48 as the piston 20 is tightened on the rod 18.

Thus it will be appreciated that the key 38 by being engaged in the recesses 42 and 44 will act to prevent the piston 20 from rotating relative to the piston rod 18 and that the enlarged left end portion 40 of the guide member 28 will keep the key 38 in place. Further, it will be appreicated that, since the key 38 is loosely received on the member 28, forces acting in a direction tending to rotate the piston 20 relative to the rod 18 will not be transferred to the member 38 and thus will not tend to loosen the latter.

Figure 4:
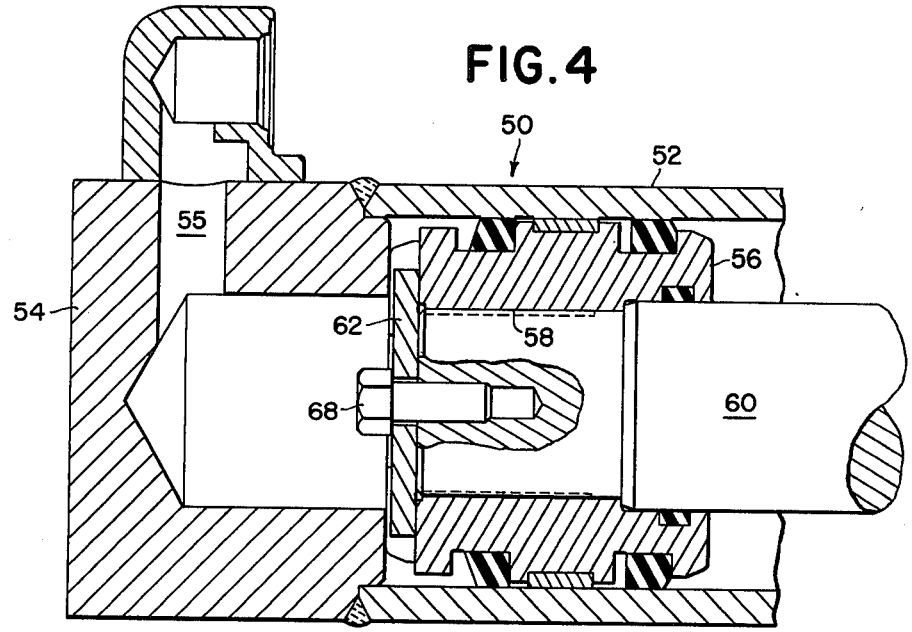
FIG. 4 is a partial longitudinal sectional view of a hydraulic actuator embodying a second form of piston and piston rod constructed according to the principles of the present invention.
Figure 5:
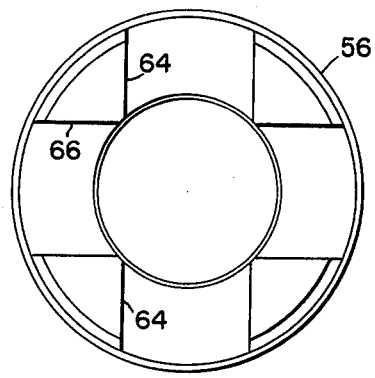
FIG. 5 is a left end view of the piston shown in FIG. 4.

Referring now to FIG. 4, therein is shown a hydraulic actuator indicated in its entirety by the reference numeral 50. The actuator 50 differs from the actuator 10 in that it is not designed so as to include means for braking the piston and piston rod assembly thereof. Specifically, the actuator 50 includes a cylinder 52 to which is fixed right and left end members or caps, only the left end member 54 being shown. A fluid passage 56 extends through the member 54 for permitting fluid to be supplied to and exhausted from the cylinder 52. Extending axially in the cylinder 52 and having a piston 56 threadedly received on the left end thereof, as at 58, is a piston rod 60.

Provided for preventing the piston 56 from rotating on the rod 60 once the piston 56 is threaded into place is a key or lock element 62 received in a first set of diametrically opposite recesses (not shown) formed in the left end of the rod 60, in a manner similar to the way that the recess 42 is formed in the piston rod 18, and in a first set of diametrically opposite recesses 64 formed in the left end of the piston 56. The recesses 66 differ from the recesses 44 of the piston 20 described above, in that they extend to the periphery of the piston 56. A second set of diametrically opposite recesses 66 is provided in the piston 56. The key 62 is held in place by a cap screw 68, which is loosely received in a hole provided in the key, and is threaded axially into the left end of the rod 60.

The operation of the actuators 10 and 50 is thought to be clear from the foregoing description and for the sake of brevity no further description of the operation is given.

I claim:

1. In a hydraulic actuator including a cylinder having a capped end and a piston and rod having respective threaded end portions with the piston being threaded on the rod and received in the cylinder, a fluid passage located in the capped end and including an inner end defining an axially centered valve seat, a blind bore extending into the piston rod from an extreme end of the latter in axial alignment with the valve seat, a valve element reciprocably received in the blind bore, and a spring biasing the valve element toward engagement with the valve seat, an improved means for preventing the piston from accidentally rotating relative to the piston rod, comprising: a diametrically extending recess located in the extreme end of the rod; said piston having an extreme end provided with a diametrically extending recess disposed in radial alignment with the recess in the rod; a locking member being received on the valve element and in the respective recesses of the rod and piston; and a guide member for the valve element having the latter reciprocably received therein and being threaded into said blind bore; and said guide member including a flange located adjacent to the locking member for retaining the latter in the respective recesses of the rod and piston.

* * * * *